United States Patent Office 2,773,577
Patented Dec. 11, 1956

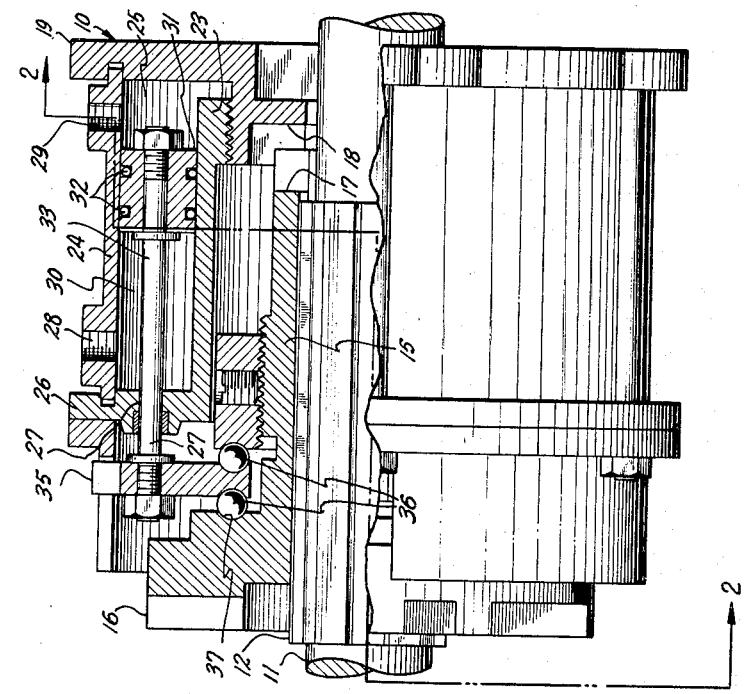
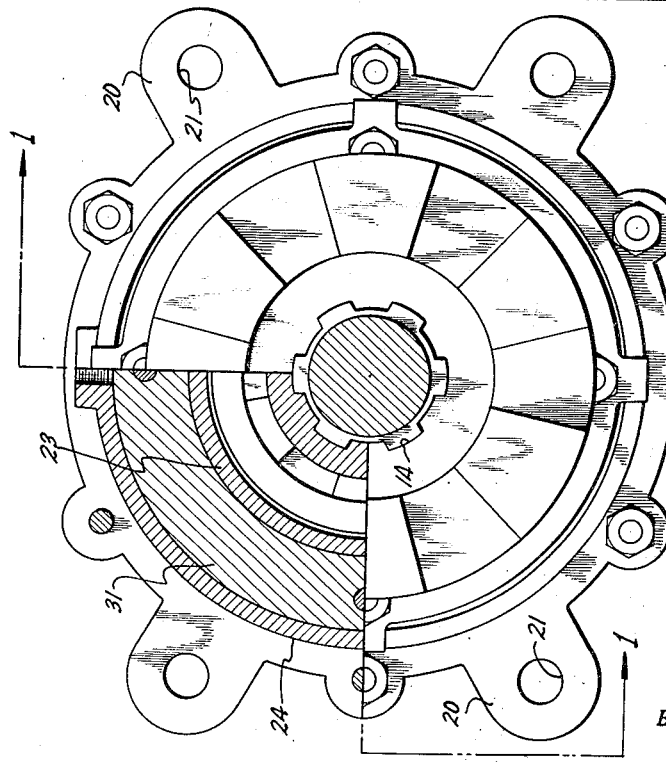

2,773,577

AIR VALVE WITH RING-TYPE PISTON

Vladimir Kapenkin, Los Angeles, Calif.

Application May 12, 1953, Serial No. 354,478

2 Claims. (Cl. 192—85)

The present invention relates to a new and improved air valve which is designed to be operated as a clutch and brake actuated by fluid pressure.

It is a broad object of the present invention to provide a fluid actuated mechanism which marks a distinct improvement over prior constructions because of its comparative simplicity, effectiveness and low space requirements.

A further object of the instant invention is to provide a combined device of the class described in which a generally ring-shaped double acting piston is disposed in a correspondingly shaped cylinder, and in which this cylinder is located around a shaft and a sliding member so as to be rotatable with respect to these members. A more specific object of the invention is to provide such a construction wherein one end of said sliding member is adapted to serve as a clutch plate and the other end of said member serves as a braking surface. If desired, the term "clutch" can be substituted for the term "brake" as used herein, and the term "braking surface" can be replaced by the phrase "clutch plate."

Still further objects of the present invention, and advantages of it will be apparent from the remainder of this specification, the appended claims and the accompanying drawings in which:

Fig. 1 is a side view, partly in longitudinal section along line 1—1 of Fig. 2 of the device of the invention; and Fig. 2 is an end view, partly in longitudinal section taken along line 2—2 of Fig. 1.

The details of the present invention are best explained with reference to the drawing, where there is shown a valve mechanism 10. As broadly indicated in the preceding discussion, this mechanism includes a shaft 11 equipped with splines 12 which are adapted to coact with complementarily shaped means 14 formed on the internal surface of a sliding member 15 disposed about the shaft 11. This sliding member is provided with an end surface 16, which is adapted to serve as a clutch plate, and another end 17, which is adapted to serve as a brake surface when placed in engagement with another surface 18 formed upon a frame 19. This frame 19 contains projecting lugs 20 having apertures 21, which lugs and apertures are designed to be used in attaching the mechanism of the present invention to an appropriate supporting surface or member.

Attached to the frame 19 are internal and external walls 23 and 24 respectively of a generally ring-shaped cylinder 25, one end of which is defined by the frame 19 and the other end of which is defined by a wall 26 provided with a plurality of apertures 27. Both the cylinder 25 and the apertures 27 are spaced substantially symmetrically around the shaft 11. The cylinder 25 is also disposed symmetrically about this shaft 11 so as to be substantially coaxial with the shaft 11. Adjacent to the frame 19 and the wall 26 appropriate inlets 28 and 29 are placed within the outer wall 24 leading into the interior 30 of the cylinder 25. Placed within this interior 30 is a double-acting piston 31 having appropriate piston rings 32 disposed adjacent to the outer surface thereof in the established manner. The piston 31 is attached to piston rods 33 which project through the apertures 27 to the exterior of the cylinder 25, where they are rigidly attached to one another by means of a generally ring-shaped disc 35 surrounding the sliding member 15. This ring-shaped disc 35 is connected to the sliding member 15 by what may be termed bearing means, such bearing means consisting of roller bearings 36 disposed upon opposite sides of the disc 35 between this disc and flange surfaces 37 extending radially from the sliding member 15. It is to be understood that the roller bearings 36 are held in position by means of grooves formed in the supporting surfaces for these bearings.

Those skilled in the art will realize that the instant invention may be modified in a number of specific ways known to the art to accomplish the same purpose as the specific elements illustrated. For convenience of illustration, conventional means shown on the drawing such as bolts, threaded joints, etc., accomplishing the obvious purpose have not been specifically mentioned in this explanation of the invention. It is believed that those skilled in the art will further realize that the construction described herein is extremely effective in operation, and is capable of taking extremely large thrust loads.

I claim:

1. A device of the class described which comprises: a shaft, a plurality of splines on said shaft, a splined sliding member positioned on said shaft surrounding said splines, said member having an end adapted to serve as a clutch plate and an end adapted to serve as a brake surface, a ring-shaped cylinder positioned generally around said sliding member so as to be coaxial with said shaft, means defining fluid passages adjacent to the ends of said cylinder, a ring-shaped double-acting piston positioned within said cylinder between said fluid passages, means defining a plurality of spaced apertures within one end of said cylinder, piston rods connected to said piston and projecting from said cylinder through said apertures, a generally ring-shaped disc surrounding said sliding member and secured to said piston rods, bearing means connecting said disc to said sliding member so that as said disc is moved said sliding member is moved on said shaft, means attached to said cylinder adjacent to said brake surface adapted to serve as a brake surface, and means attached to said cylinder for securing said cylinder to a supporting surface.

2. A construction as defined in claim 1, wherein said bearing means comprise roller bearings placed upon opposite sides of said disc between said disc and flange means extending radially from said sliding member.

References Cited in the file of this patent

UNITED STATES PATENTS

| | | |
|---|---|---|
| 1,864,126 | Ferris | June 21, 1932 |
| 2,205,989 | Meyers et al. | June 25, 1940 |
| 2,342,880 | Masek | Feb. 29, 1944 |
| 2,489,258 | Bebinger et al. | Nov. 29, 1949 |
| 2,578,308 | Iavelli | Dec. 11, 1951 |
| 2,603,327 | King | July 15, 1952 |